Dec. 23, 1958   J. R. CHIVERS   2,865,281
TOASTER APPARATUS
Filed Jan. 4, 1957   2 Sheets-Sheet 1
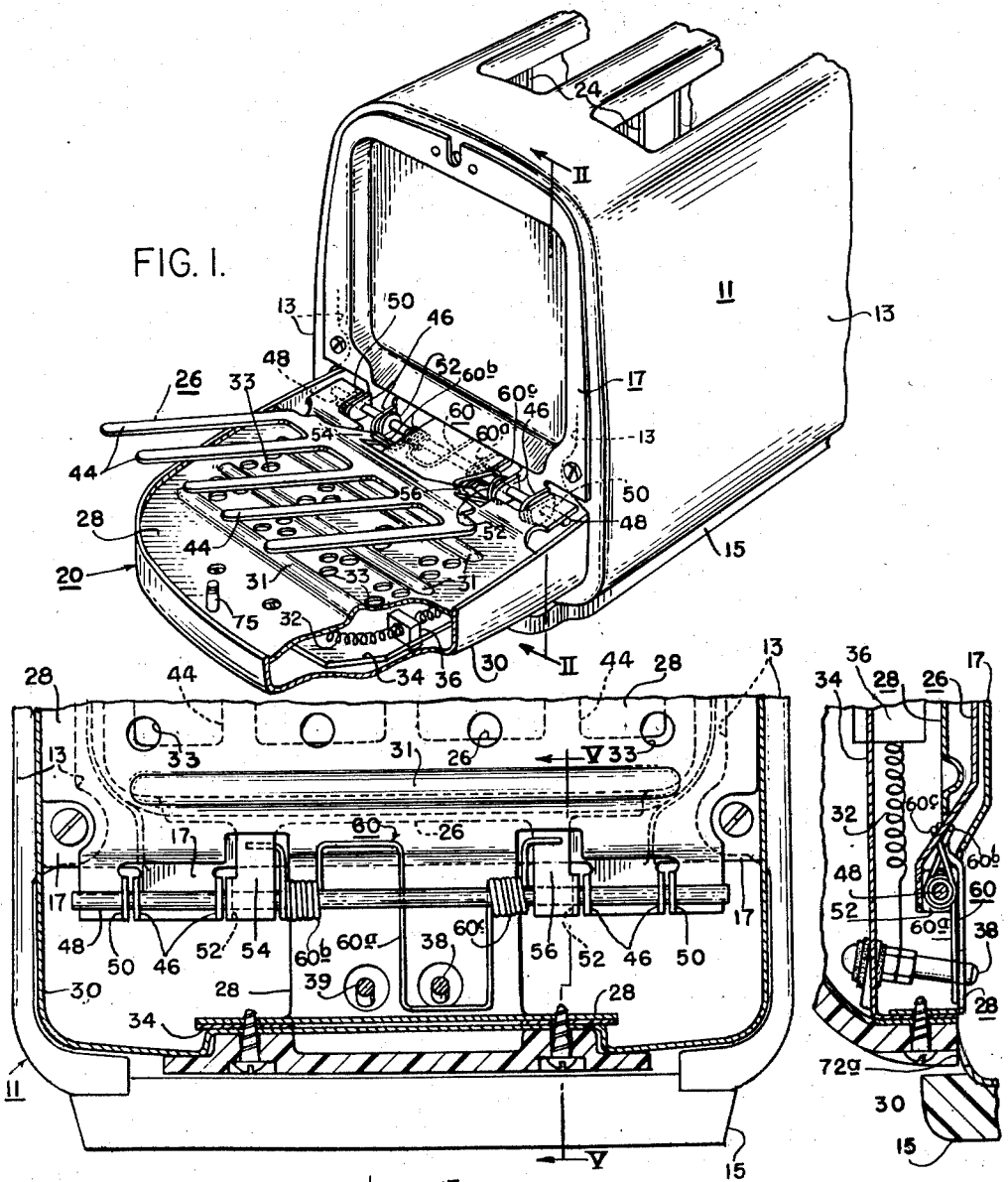
INVENTOR
JAMES R. CHIVERS
BY M. C. Freudenberg
ATTORNEY Dec. 23, 1958  J. R. CHIVERS  2,865,281
TOASTER APPARATUS
Filed Jan. 4, 1957  2 Sheets-Sheet 2
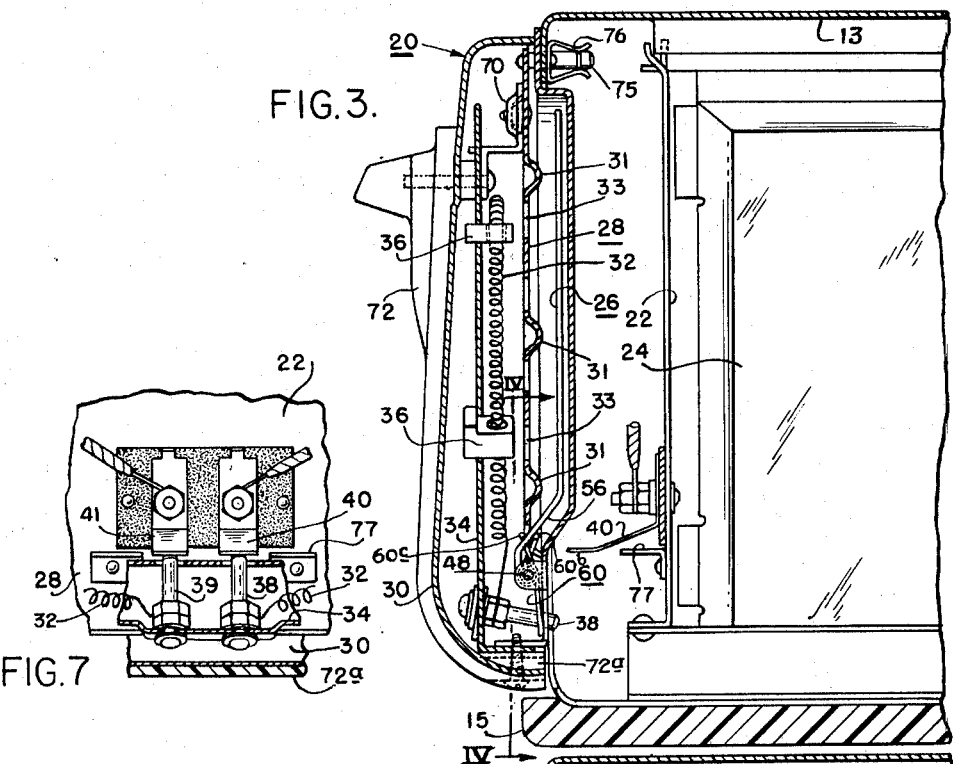
FIG. 3.
FIG. 7
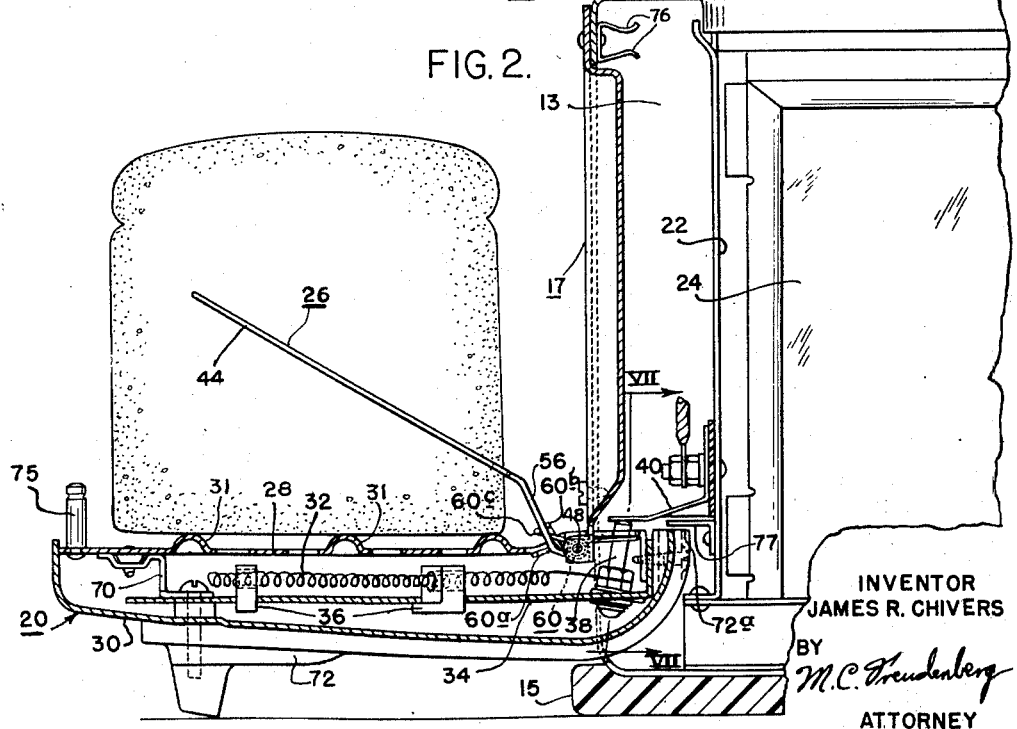
FIG. 2.
INVENTOR
JAMES R. CHIVERS
BY
M.C. Freudenberg
ATTORNEY

United States Patent Office 2,865,281
Patented Dec. 23, 1958

2,865,281

TOASTER APPARATUS

James R. Chivers, Mansfield, Ohio, assignor to Westinghouse Electric Corporation, East Pittsburgh, Pa., a corporation of Pennsylvania Application January 4, 1957, Serial No. 632,536

4 Claims. (Cl. 99—339)

This invention relates to a toast-warming device of the type referred to in B. F. Parr application Serial No. 629,036, Filed December 18, 1956, assigned to the assignee of the present invention, the warming device being attached to an electric toaster for supporting and warming toast slices after their removal from toasting chambers within the toaster.

Heretofore, several different arrangements have been suggested for toasters for maintaining toasted bread slices warm after their removal from the toaster. Most of these prior art devices were subject to some drawbacks, such as being of bulky size, not uniformly heating the toast slices, requiring that the bread slices be stacked flat one upon the other whereby some become dry and others tend to become soggy, and in many instances prior devices of this kind have detracted from the appearance or styling of the toaster casings.

It is an object of this invention to provide an improved toast-warming device for an electric toaster which may be moved to a non-operating position in which its general outline blends with the toaster casing.

It is another object of this invention to provide an improved retractable toast-supporting rack for use with a toast-warming device on an electric toaster.

It is another object of this invention to simplify the mounting means for a toast-warming device and toast-supporting rack on a wall of a toaster housing.

Still another object of this invention is to improve the switching means for automatically energizing an electrical heater in a warming device that is pivotally attached to a toaster housing wherein the switch structure will always remain concealed.

Another object of this invention is to provide improved positioning means for a toast rack to be supported above a toast-warming device.

In accordance with this invention, an electric toaster having a vertical end wall is provided with an improved toast-warming device pivotally supported on a horizontal axis on the end wall of the toaster for movement between a vertical non-operating position and a horizontal heating position. The toast-warming device comprises a flat shell containing an electrical resistance element that is automatically energized by electrical switch means concealed behind the end wall of the toaster. A bifurcated toast rack having a plurality of toast spacing fingers is hinged to the end wall of the toaster for pivotal movement on the same hinge axis as the warming device, both of these movable members being preferably supported by a common hinge pin.

The rack is provided with spring means biasing it toward a restracted position adjacent the end wall of the housing, and additional means operated by pivotal movement of the toast-warming device acts on the rack to overcome this bias and move the rack to a position inclined with respect to both the warming device and the end wall of the toaster housing. The rack is free to move against the spring biasing means to prevent damage thereto by forces applied to the fingers thereof while inserting toast therebetween.

The foregoing and other objects are effected by the invention as will be apparent from the following description and claims taken in connection with the accompanying drawings, forming a part of this application, in which:

Fig. 1 is a perspective view of one end of a toaster embodying a hinged toast-warming heater and a hinged rack for supporting toast above the heater;

Fig. 2 is a vertical section taken on line II—II of Fig. 1 and showing a bread slice positioned on the toast-warming heater;

Fig. 3 is a vertical section taken on the same line as that for Fig. 2; but showing the toast-warming heater and toast rack in their vertical or retracted positions;

Fig. 4 is an enlarged vertical section taken on line IV—IV of Fig. 3;

Fig. 5 is a vertical section taken on line V—V of Fig. 4;

Fig. 6 is a vertical section similar to that of Fig. 5, but showing the toast-warming heater and toast rack in the toast-warming positions indicated in Fig. 2; and Fig. 7 is a vertical section taken on line VII—VII of Fig. 2.

Referring to Fig. 1 of the drawings, there is illustrated one end of an electric toaster 11, the housing of which includes a generally inverted U-shaped metal wrapper 13 attached to a plastic thermally insulating base 15. The upper part of the wrapper is provided with a plurality of openings providing access to toasting compartments within the toaster casing. The illustrated end of the toaster housing is closed, at least in part, by a metal panel 17 attached to the wrapper 13 by any suitable means, such as screws. The other end of the toaster housing may be closed by any suitable means, the external appearance of which might be generally similar to the configuration of a toast-warming heater structure 20 to be described below. Supported within the toaster casing on the base is a frame 22, shown in Figs. 2 and 3, to which is secured a plurality of toasting heaters 24, of any well known construction, disposed to heat the opposite faces of bread slices within the toasting compartments.

The end panel 17 adjacent the toast-warming heater 20 is formed of a metal sheet with a large central recess for accommodating a toast-supporting rack 26 to be referred to hereinafter. The toast-warming device 20 comprises a generally flat perforated metal grid or plate 28 pivotally secured, as described hereinafter, on a horizontal axis near the bottom of the end panel 17 of the toaster and having a dished metal member 30 underlying it when the panel 17 is in a horizontal position. The plate and dished member define a relatively flat shell or enclosure for an auxiliary open wire electrical resistance heating element 32. The element 32 is of low wattage, approximately 100 watts, relative the toasting heaters 24. The plate 28 is movable to a vertical position in which the dished metal member forms a cover for concealing both the plate 28, which forms the heating face of the warming structure, and the bread rack 26. The heating face of plate 28 is provided with a plurality of raised ribs or projections 31 for supporting toast slices on edge spaced above the perforations 33 in the plate 28 to permit heat to more readily pass from the heater 32 to the toast.

The resistance heating element 32 is supported inside the shell of the warming device 30 adjacent a large central area of the plate 28, in a plane generally parallel thereto, by means of a reflecting metal sheet 34, the open wire element being carried by ceramic electrical insulating members 36 fastened to the sheet. At one edge of the sheet 34 near the pivotal axis of the warming device 30, there are secured a pair of terminal pins 38 and 39 electrically insulated from the sheet 34 and connected to the ends of the resistance element 32. The lower portion of the heating structure 20, as seen in Fig. 3, adjacent thermal pins 38 and 39 may be swung beneath and behind the end wall 17 into the toaster housing to cause the pins 38 and 39 to engage resilient electrically conducting strips 40 and 41, as seen in Figs. 2, 3 and 7, secured in electrically insulating relationship on the heater supporting frame 22 within the toaster housing.

The heating structure 20 at all times substantially closes the gap at the end of the toaster housing between the end panel 17 and the base 15 and its lower end occupies the gap during the swinging movement mentioned above. In the operating position of the toast-warming structure 20, the electrical circuitry for the heater 32 extends through this gap within the end of the structure 20 adjacent the hinge pin 48. The strips 40 and 41 are at all times concealed and provide means for automatically energizing the resistance element 32 from any suitable power source independent of energization of the toasting heaters 24 when the warming device 20 is moved from its vertical position to its horizontal heating position. This construction eliminates the need for flexible electrical wires extending between the toaster housing and the warming structure 20.

The toast-supporting rack 26 is a bifurcated structure formed in any suitable manner, such as by stamping it from a metal sheet, to provide a plurality of generally parallel fingers 44 extending transversely of the ribs 31 on the warming device 20 and disposed to receive toast slices therebetween and support the latter on edge on these ribs on the upper surface of the warming device 20. The rack 26 is pivotally supported by the toaster on the same hinge axis as the warming device 20.

Referring to Fig. 4, the end panel 17 of the housing is formed with a plurality of projecting tabs 46 having apertures therein for receiving the hinge pin 48. These tabs project into the shell of the warming device 20 adjacent similar apertured tabs 50 and 52 on the plate 28 and the rack 26, respectively, for supporting them on the hinge pin 48. The tabs 50 on the plate 28 are bent to project into the shell of the warming device 20, whereas, the tabs 52 are formed on supporting legs 54 and 56 of the rack 26 extending into the warming device 20.

A biasing or positioning spring 60 for the toast rack 26 is carried by the hinge pin 48 intermediate the legs 54 and 56 and has a central portion 60a whose position is fixed by abutting the undersurface of the plate 28. This spring 60 has separate resilient portions illustrated by coils 60b and 60c wound around the hinge pin 48 at opposite sides of the central portion 60a and biasing the ends of the spring 60 in opposite directions. As seen in Fig. 4, one end of the spring lies in front of the leg 56 of the toast-supporting rack and biases the latter toward the end wall 17 of the toaster housing. The other end of the spring is located behind the leg 54 and biases the bread rack toward the toast-warming heater 20.

The separate resilient coils 60b and 60c of the spring 60 are so constructed that they will counter-balance each other and move the bread rack to an angular position substantially inclined with respect to both the end wall 17 of the toaster housing and the heating face of the warming heater 20 when the latter is in its horizontal heating position. In the event that the rack 26 is inadvertently forced either upwardly or downwardly during positioning of the toast slices between the fingers 44 thereof, it will move with the force in either direction of pivotal movement without damage thereto and will automatically return to the inclined position described above when such forces are relieved.

When the warming device 20 is pivoted from its horizontal heating position toward the panel 17, the rack 26 will not move relative the warming device 20 until the rack abuts the panel 17. After this abutment takes place, further movement of the rack 26 is prevented and additional movement of the warming device 20 will store additional energy in the spring coil 60c and relieve the stress on the other spring coil 60b. Similarly, when the warming device 20 is moved from the position shown in Fig. 3 to the position of Fig. 2, its initial movement will relieve the stress in the spring coil 60c and increase the stress in the other spring coil 60b until their respective forces on the legs of the rack 26 are substantially counter-balanced, whereafter the rack will swing out with no further movement relative the warming device 20 as the latter moves to its horizontal heating position. Thus, the spring coil 60b provides means for overcoming the force of the other spring coil 60c on the leg 56 to swing the rack 26 out to the position of Figs. 1 and 2 as the heating device moves to its horizontal position. The sides of the dished metal member 30 hold the hinge pin against slipping out of the tabs on the end panel 17, plate 28, and rack 26.

The heating device is assembled by first securing the end panel 17, plate 28, rack 26, and spring 60, together as one subassembly by means of the hinge pin 48. The reflecting sheet 34 and heating element 32 are secured within the dished member 30, along with a bracket 70, by means of a screw extending through each of the bracket 70, sheet 34 and dished member 30 into a plastic handle 72 on the outer side of the dished member 30, forming a second subassembly. This second subassembly is then attached to the subassembly including the plate 28 by screwing the plate 28 to the bracket 70 as seen in Figs. 2 and 3, and suitably securing the lower part of the plate 28 as with sheet metal screws to the lower portion of the second subassembly as shown clearly in Figs. 4 and 5. The entire warming device, including the pivoted bread rack 26 and end wall 17 of the casing may thus be formed as a complete subassembly which may be conveniently attached to the end of the toaster to facilitate the manufacture thereof.

The toast-warming device 20 may be retained in its non-operating position as shown in Fig. 3 by means of a pin 75 attached to the plate 28 and extending through an opening in the end wall 17 of the toaster housing and gripped by a friction spring 76 within the housing. An abutment or stop 77 is provided on the frame 22 within the toaster housing to limit the downward swing of the warming device 20. The stop 77 engages a lower extension 72a of the handle or other adjacent part of the warming device 20 preventing the latter from swinging much beneath the position illustrated in Fig. 2 in the event the toaster is lifted from a supporting surface with the heating device in its horizontal position. This arrangement also prevents damage to the contact springs 40 and 41 during such lifting.

The toast-warming and rack structure defined above provides a simplified, low-cost construction for maintaining toast slices warm after they are removed from the toasting chambers of the toaster. The warming device 20, rack 26 and end panel 17 of the toaster as illustrated are supported for only pivotal movement relative each other on a common axis to substantially eliminate sliding movement of the parts on each other to reduce wear and noise during manipulation of the warming device and rack. The electrical switching elements are completely inaccessible to prevent tampering therewith and to provide trouble-free operation. It will be noted that the complete assembly retains a pleasing appearance when the warming device is in its retracted or vertical position since the device complements the wrapper and retains continuity of the lines or design thereof.

While the invention has been shown in but one form, it will be obvious to those skilled in the art that it is not so limited, but is susceptible of various changes and modifications without departing from the spirit thereof.

What is claimed is:

1. A toaster comprising a housing, a generally horizontal pivot pin carried by one side of the housing and adjacent the bottom margin thereof, a toast warming structure movably supported by said pin and including a heating element for supplying heat from one face of the structure to toast to be warmed, said structure being movable upwardly about the pin to a first position contiguous the housing and downwardly to a second position wherein the structure extends from the housing with said face upwardly exposed, a toast rack carried by said pivot pin for movement relative the housing from a position contiguous the housing to a second position wherein the rack extends above the toast warming structure in said second position of the latter, and switch means for energizing said heating element responsive to movement of said structure to said second position thereof.

2. A toaster comprising a housing, a generally horizontal pivot pin carried by one side of the housing and adjacent the bottom margin thereof, a toast warming structure movably supported by said pin and including a heating element for supplying heat from one face of the structure to toast to be warmed, said structure being movable upwardly about the pin to an inactive position contiguous the housing and downwardly to an active position wherein the structure extends from the housing with said face upwardly exposed, a toast rack carried by said pivot pin for movement relative the housing from a position contiguous the housing to a second position wherein the rack extends above the toast warming structure in said active position of the latter, said rack having spaced fingers for positioning a plurality of toast slices in generally vertical position with their lower edges resting upon said face of the warming structure, and switch means for energizing said heating element responsive to movement of said structure to said active position thereof.

3. A toaster comprising a housing having a generally vertical end wall, a substantially horizontal pivot pin disposed adjacent the bottom of the end wall, a toast warming structure movably supported by said pin and including an electric element for heating one face of the structure and the toast to be warmed, said structure being movable upwardly about the pin to an inactive position contiguous one side of the end wall and downwardly to an active position wherein the structure extends from the end wall with said heated face upwardly exposed, a toast rack carried by the pivot pin for movement relative the end wall from a position contiguous said one side of the end wall to a second position wherein the rack extends above said heated face of the warming structure in the active position of the latter, switch means for energizing said heating element responsive to movement of the structure to the active position thereof and including a contact carried by the warming structure and movable beneath said wall during downward movement of the toast warming structure and a second contact disposed on the opposite side of the end wall and engaged by the first contact when the toast warming structure is actuated to its active position.

4. A toaster comprising a housing, a generally horizontal pivot pin carried by one side of the housing and adjacent the bottom margin thereof, a toast warming structure movably supported by said pin and including a heating element for supplying heat from one face of the structure to toast to be warmed, said structure being movable upwardly about the pin to an inactive position contiguous the housing and downwardly to an active position wherein the structure extends from the housing with said face upwardly exposed, a toast rack movably supported by the pivot pin, a helical torsion spring coaxially arranged on the pin and having a portion engaging the warming structure for positioning the spring upon the pin, said spring having opposed resilient portions engaging, respectively, opposite sides of the rack and positioning the rack above said face of the warming structure in the active position thereof, said spring resiliently biasing the rack against said housing when the warming structure is moved to its inactive position, and switch means for energizing said heating element in response to movement of the warming structure to the active position thereof.

References Cited in the file of this patent

UNITED STATES PATENTS

| | | |
|---|---|---|
| 1,179,340 | Smith | Apr. 11, 1916 |
| 1,669,318 | Baad | Mar. 8, 1928 |
| 1,832,831 | Ginder | Nov. 17, 1931 |
| 1,885,041 | Baker | Oct. 25, 1932 |
| 1,952,763 | Lux | Mar. 27, 1934 |
| 2,052,919 | Brogdon et al. | Sept. 1, 1936 |
| 2,092,226 | Simons | Sept. 7, 1937 |
| 2,121,444 | Osnow | June 21, 1938 |
| 2,722,592 | Pellegrin | Nov. 1, 1955 |
| 2,738,411 | Sandin | Mar. 13, 1956 |